United States Patent
Eschenburg et al.

(10) Patent No.: US 10,591,037 B2
(45) Date of Patent: Mar. 17, 2020

(54) DRIVE AXLE SYSTEM HAVING A PLANETARY INTERAXLE DIFFERENTIAL UNIT

(71) Applicant: ArvinMeritor Technology, LLC, Troy, MI (US)

(72) Inventors: Dale Eschenburg, Rochester Hills, MI (US); Brian D. Hayes, Newark, OH (US); Robert J. Martin, Harrison Township, MI (US); Phillip Leicht, South Lyon, MI (US); Pedro Garcia, Clarkston, MI (US); Christopher Keeney, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 38 days.

(21) Appl. No.: 16/059,226

(22) Filed: Aug. 9, 2018

(65) Prior Publication Data
US 2020/0047615 A1 Feb. 13, 2020

(51) Int. Cl.
| | |
|---|---|
| *B60K 23/08* | (2006.01) |
| *F16H 37/08* | (2006.01) |
| *F16H 1/28* | (2006.01) |
| *F16H 48/05* | (2012.01) |
| *B60K 17/36* | (2006.01) |
| *F16D 11/14* | (2006.01) |
| *F16H 48/08* | (2006.01) |
| *F16D 11/00* | (2006.01) |

(52) U.S. Cl.
CPC ........... *F16H 37/082* (2013.01); *B60K 17/36* (2013.01); *B60K 23/0808* (2013.01); *F16D 11/14* (2013.01); *F16H 1/28* (2013.01); *F16H 48/05* (2013.01); *F16H 48/08* (2013.01); *F16D 2011/004* (2013.01)

(58) Field of Classification Search
CPC ..................................................... F16H 37/082
See application file for complete search history.

(56) References Cited

U.S. PATENT DOCUMENTS

| | | | |
|---|---|---|---|
| 2,312,263 A * | 2/1943 | Ormsby | F16H 3/64 475/204 |
| 3,199,375 A | 8/1965 | Rosen et al. | |
| 4,263,824 A | 4/1981 | Mueller | |
| 4,914,979 A | 4/1990 | Balmforth | |

(Continued)

FOREIGN PATENT DOCUMENTS

| | | |
|---|---|---|
| DE | 1430473 A1 | 10/1968 |
| DE | 19805881 C1 | 6/1999 |

(Continued)

OTHER PUBLICATIONS

Dale Eschenburg, et al, U.S. Appl. No. 16/190,818, filed with the U.S. Patent and Trademark Office on Nov. 14, 2018.

(Continued)

*Primary Examiner* — Timothy Hannon
(74) *Attorney, Agent, or Firm* — Brooks Kushman P.C.

(57) ABSTRACT

A drive axle system having a planetary interaxle differential unit. A shift collar may be movable along an axis between a first position and a second position. The shift collar may operatively connect a sun gear to a drive pinion when in the first position. The shift collar may operatively connect the sun gear to a planet carrier when in a second position.

20 Claims, 12 Drawing Sheets

(56) References Cited

U.S. PATENT DOCUMENTS

| | | | |
|---|---|---|---|
| 5,092,188 A * | 3/1992 | Fujikawa | B60K 23/0808 180/249 |
| 5,989,143 A | 11/1999 | Bell et al. | |
| 8,382,633 B2 | 2/2013 | Cooper et al. | |
| 8,398,520 B1 | 3/2013 | Bassi et al. | |
| 8,523,738 B2 | 9/2013 | Morscheck et al. | |
| 8,562,479 B2 | 10/2013 | Hamperl et al. | |
| 8,651,994 B2 | 2/2014 | Bassi et al. | |
| 8,845,473 B2 | 9/2014 | Nett et al. | |
| 8,851,212 B2 | 10/2014 | Kahl | |
| 8,911,321 B2 | 12/2014 | Ziech et al. | |
| 9,020,715 B2 | 4/2015 | Nellums et al. | |
| 9,102,232 B2 | 8/2015 | Ziech et al. | |
| 9,109,635 B2 | 8/2015 | Boothby et al. | |
| 9,121,455 B2 | 9/2015 | Cooper | |
| 9,284,995 B2 | 3/2016 | Lawson et al. | |
| 9,333,857 B2 | 5/2016 | Morscheck et al. | |
| 9,428,050 B2 | 8/2016 | Ziech et al. | |
| 9,457,655 B2 | 10/2016 | Ziech et al. | |
| 9,457,656 B2 | 10/2016 | Ziech et al. | |
| 9,457,657 B2 | 10/2016 | Ziech et al. | |
| 2002/0187870 A1 | 12/2002 | Staheli et al. | |
| 2011/0218715 A1 | 9/2011 | Duraiswamy et al. | |
| 2012/0202640 A1 | 8/2012 | Morimoto | |
| 2013/0085031 A1 | 4/2013 | Bassi et al. | |
| 2014/0141923 A1 | 5/2014 | Forsyth | |
| 2015/0126320 A1 * | 5/2015 | Genise | B60K 17/08 475/199 |
| 2015/0247562 A1 | 9/2015 | Valente | |
| 2016/0280066 A1 | 9/2016 | Tavvala et al. | |
| 2016/0363205 A1 | 12/2016 | Tiziani et al. | |
| 2017/0144540 A1 | 5/2017 | Kincaid et al. | |
| 2018/0147939 A1 | 5/2018 | Sharma et al. | |

FOREIGN PATENT DOCUMENTS

| | | |
|---|---|---|
| DE | 102008015200 A1 | 9/2009 |
| DE | 102008002844 A1 | 11/2009 |
| EP | 3163126 A1 | 5/2017 |
| EP | 3473477 A1 | 4/2019 |
| JP | H0999754 A | 4/1997 |
| WO | 2006004489 A1 | 1/2006 |
| WO | 2011097244 A2 | 8/2011 |
| WO | 2016205480 A1 | 12/2016 |

OTHER PUBLICATIONS

European Patent Office, Extended European Search Report for corresponding European Application No. 19173363.3-1012, dated Sep. 26, 2019.

United States Patent and Trademark Office, U.S. Appl. No. 15/667,677, filed Aug. 3, 2017.

Dale Eschenburg, et al., United States Patent and Trademark Office, U.S. Appl. No. 16/059,395, filed Aug. 9, 2018.

Dale Eschenburg, et al., United States Patent and Trademark Office, U.S. Appl. No. 15/964,780, filed Apr. 27, 2018.

* cited by examiner

DRIVE AXLE SYSTEM HAVING A PLANETARY INTERAXLE DIFFERENTIAL UNIT

TECHNICAL FIELD

This disclosure relates to a drive axle system that may have a drive axle assembly that includes a planetary interaxle differential unit.

BACKGROUND

A drive axle system having an inter-axle differential that is a planetary differential is disclosed in U.S. Pat. No. 8,523,738.

SUMMARY

In at least one embodiment, a drive axle system is provided. The drive axle system may include a drive axle assembly that may have an input shaft, a drive pinion, an output shaft, an interaxle differential unit, and a shift collar. The input shaft may be rotatable about an axis. The drive pinion may be spaced apart from the input shaft. The output shaft may extend from the drive pinion. The interaxle differential unit may be configured to operatively connect the input shaft to the drive pinion and the output shaft. The interaxle differential unit may include a planet carrier, a planetary ring gear, a sun gear, and at least one planet gear. The planet carrier may be rotatable about the axis with the input shaft. The planetary ring gear may be rotatable about the axis with the output shaft. The sun gear may be rotatably disposed on the drive pinion. The planet gear may be rotatably disposed on the planet carrier. The planet gear may mesh with the planetary ring gear and the sun gear. The shift collar may be movable along the axis between a first position and a second position. The shift collar may operatively connect the sun gear to the drive pinion when in the first position. The shift collar may operatively connect the sun gear to the planet carrier when in the second position.

In at least one embodiment, a drive axle system is provided. The drive axle system may include a drive axle assembly that may have a first differential, a drive pinion, an input shaft, an output shaft, an interaxle differential unit, and a shift collar. The first differential may be coupled to an axle shaft. The drive pinion may be rotatable about an axis and may engage the first differential. The input shaft may be rotatable about the axis. The output shaft may be spaced apart from the input shaft and the drive pinion. The interaxle differential unit may be spaced apart from the drive pinion. The interaxle differential unit may include a planet carrier, a planetary ring gear, a sun gear, and at least one planet gear. The planet carrier may be rotatable about the axis with the input shaft. The planetary ring gear may be coupled to the output shaft such that the output shaft is rotatable about the axis with the planetary ring gear. The sun gear may be rotatably disposed on the drive pinion. The planet gear may be rotatably disposed on the planet carrier and may mesh with the planetary ring gear and the sun gear. The shift collar may be movable along the axis between a first position and a second position. Torque may be transmitted between the interaxle differential unit and the first differential and the output shaft when the shift collar is in the first position. Torque may not be transmitted between the interaxle differential unit and the first differential when the shift collar is in the second position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
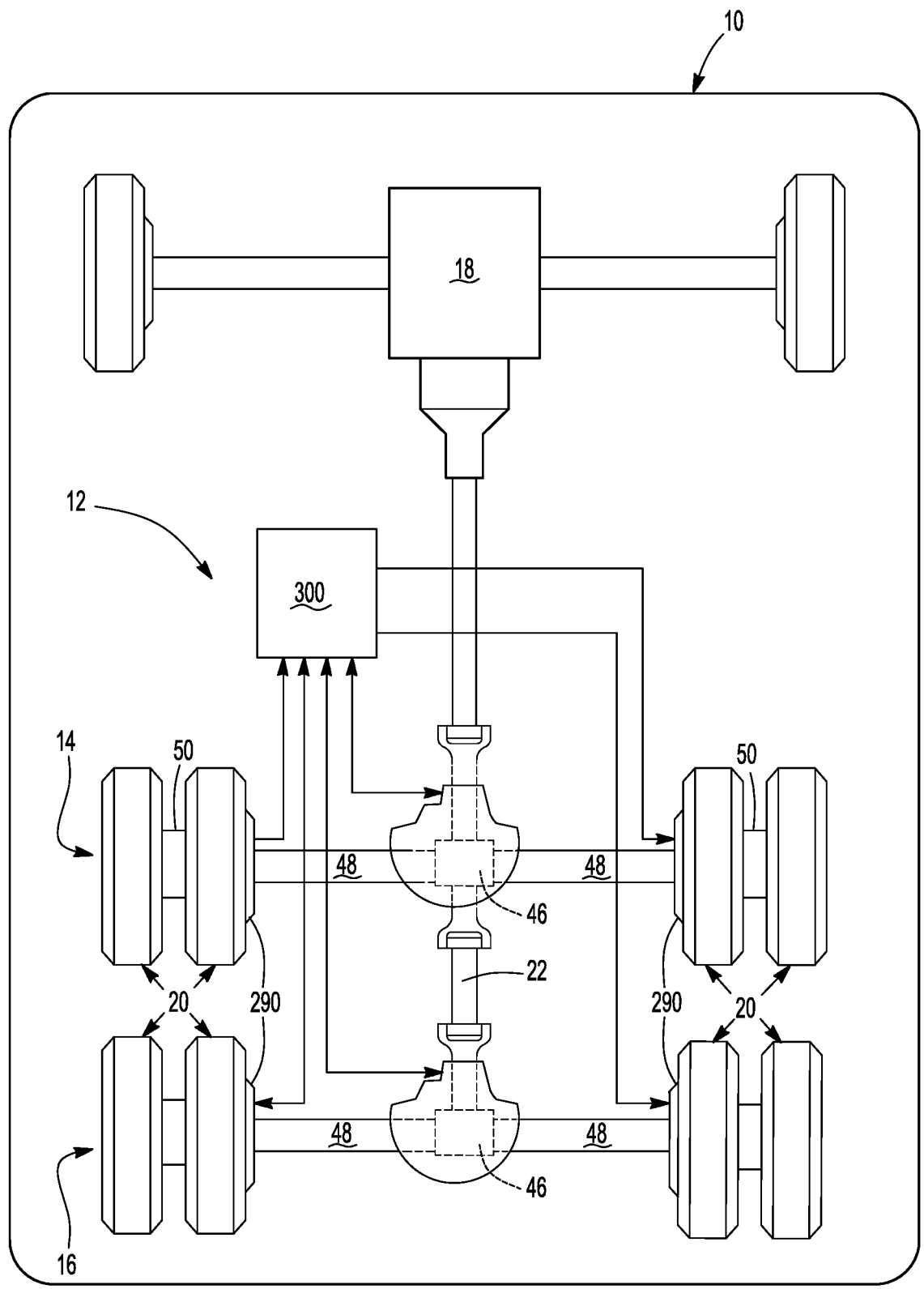
FIG. 1 illustrates an example of a drive axle system.

Referring to FIG. 1, an example of a vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments.

The vehicle 10 may have a drive axle system 12 that may include a plurality of axle assemblies, such as a first drive axle assembly 14 and a second drive axle assembly 16. A drive axle assembly may be part of a vehicle drivetrain and may receive torque from at least one torque source 18, such as an engine, electric motor, transmission, transfer case, or another axle assembly. A drive axle assembly may provide torque to one or more wheel assemblies 20, such as a tire disposed on a wheel, that may be rotatably supported on the drive axle assembly.

In FIG. 1, two drive axle assemblies are shown in a tandem axle configuration, although it is contemplated that a different number of axle assemblies may be provided. In a tandem configuration, the first drive axle assembly 14, which may also be referred to as may be referred to as a forward-rear drive axle assembly, may be connected in series with the second drive axle assembly 16, which may also be referred to as a rear-rear drive axle assembly. The first drive axle assembly 14 may be operatively connected to the torque source 18, such as with a drive shaft or other input. An output of the first drive axle assembly 14 may be coupled to an input of the second drive axle assembly 16, such as with a prop shaft 22. The prop shaft 22 may be coupled to the output of the first drive axle assembly 14 and the input of the second drive axle assembly 16 at opposing ends via couplings, such as universal joints, that may allow the first drive axle assembly 14 and the second drive axle assembly 16 to move with respect to each other while allowing the prop shaft 22 to rotate.

As will be discussed in more detail below, torque may be selectively provided to the wheel assemblies 20 of at least one of the drive axle assemblies. For example, torque may be provided to the first drive axle assembly 14 and the second drive axle assembly 16 and to their associated wheel assemblies 20 to provide sufficient torque to propel the vehicle 10 from a stationary position, when climbing a road grade, or to provide sufficient torque to meet acceleration demands. Torque may not be provided to the wheel assemblies 20 of the first drive axle assembly 14 or the wheel assemblies 20 of the second drive axle assembly 16 when torque demands are sufficiently low, such as when the vehicle is at a road cruise speed or when torque from one axle assembly is sufficient to meet propulsion or acceleration demands. Not providing torque to either the first drive axle assembly 14 or the second drive axle assembly 16 may help improve axle operating efficiency and fuel economy. Torque may not be provided to the wheel assemblies 20 of a drive axle assembly by (1) not providing torque from the torque source 18 to the differential assembly of the drive axle assembly and optionally by (2) disconnecting the differential assembly from its associated wheel assemblies 20. The combination of disconnecting a differential assembly from the torque source 18 and from its associated wheel assemblies 20 may allow the differential assembly to remain substantially stationary, which may reduce churning losses due to drag forces exerted by lubricant on the ring gear of the differential assembly and may help improve axle operating efficiency.

Figure 2:
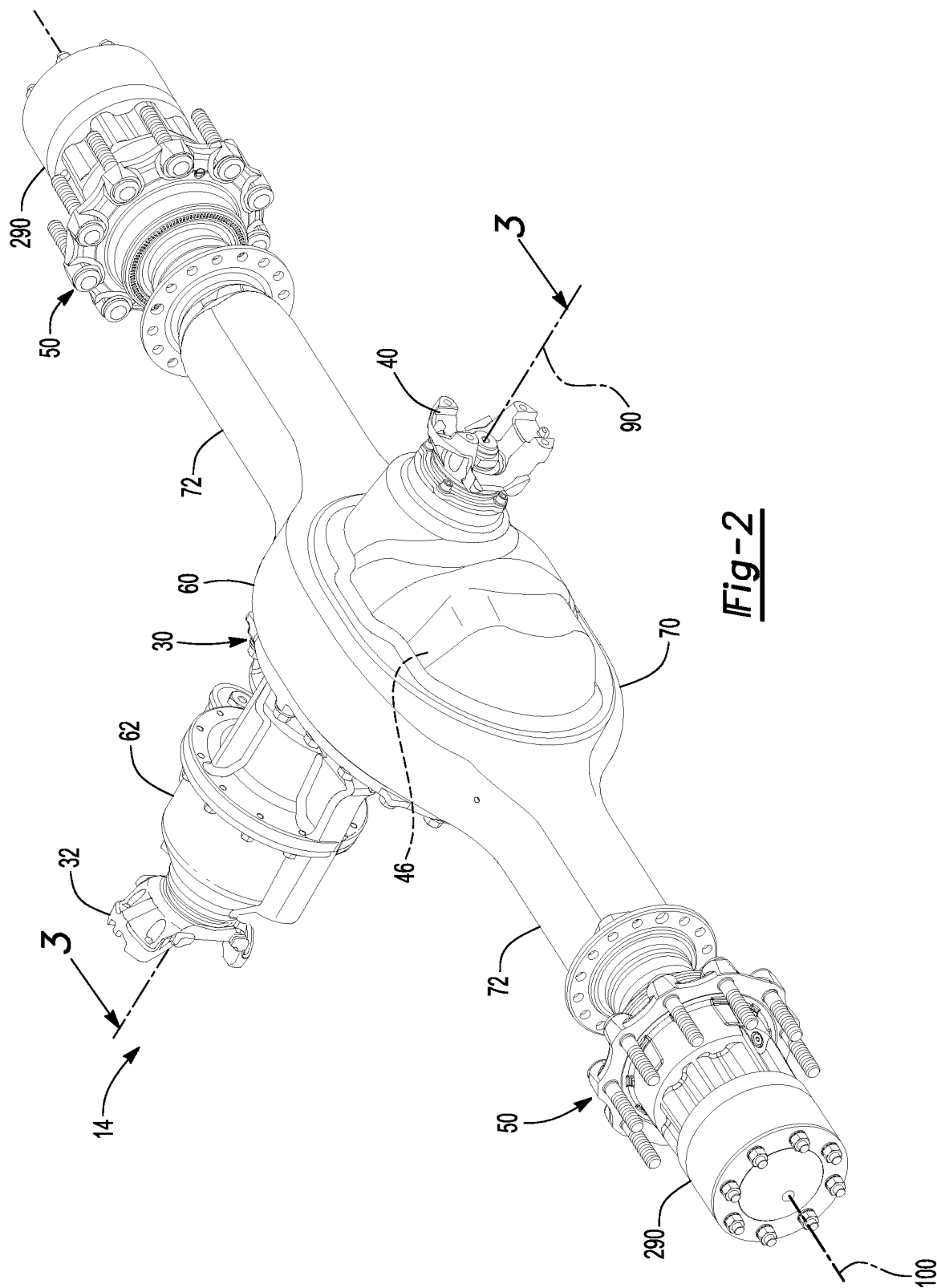
FIG. 2 is a perspective view of an example of a drive axle assembly that may be provided with the drive axle system.

Referring to FIG. 2, an example of a drive axle assembly is shown. The example shown in FIG. 2 is primarily referenced below in the context of being the first drive axle assembly 14; however, it is to be understood that the first drive axle assembly 14 may be provided in other configurations, such as by incorporating a different type of wheel end disconnect or omitting wheel end disconnects. In addition, it is also contemplated that the second drive axle assembly 16 rather than the first drive axle assembly 14 may be provided with a differential that may be disconnectable from the torque source 18 and from its associated wheel assemblies 20 in one or more configurations. In the configuration shown in FIG. 2, the axle assembly may include a housing assembly 30, an input yoke 32, an input shaft 34, a drive pinion 36, an output shaft 38, an output yoke 40, an interaxle differential unit 42, a shift collar 44, a differential 46, a pair of axle shafts 48, and optionally a pair of wheel end disconnects 50.

Referring to FIG. 2, the housing assembly 30 may receive various components of the axle assembly. In addition, the housing assembly 30 may facilitate mounting of the axle assembly to the vehicle. The housing assembly 30 may include an axle housing 60 and a differential carrier 62.

The axle housing 60 may receive and support the axle shafts 48. In at least one embodiment, the axle housing 60 may include a center portion 70 and at least one arm portion 72.

The center portion 70 may be disposed proximate the center of the axle housing 60. The center portion 70 may define a cavity that may receive the differential 46. A lower region of the center portion 70 may at least partially define a sump portion that may contain lubricant. Splashed lubricant may flow down the sides of the center portion 70 and may flow over internal components of the axle assembly and collect in the sump portion.

One or more arm portions 72 may extend from the center portion 70. For example, two arm portions 72 may extend in opposite directions from the center portion 70 and away from the differential 46. The arm portions 72 may have substantially similar configurations. For example, the arm portions 72 may each have a hollow configuration or tubular configuration that may extend around and may receive the corresponding axle shaft 48 and may help separate or isolate the axle shaft 48 from the surrounding environment. An arm portion 72 or a portion thereof may be integrally formed with the center portion 70 or may be separate from the center portion 70.

Figure 3:
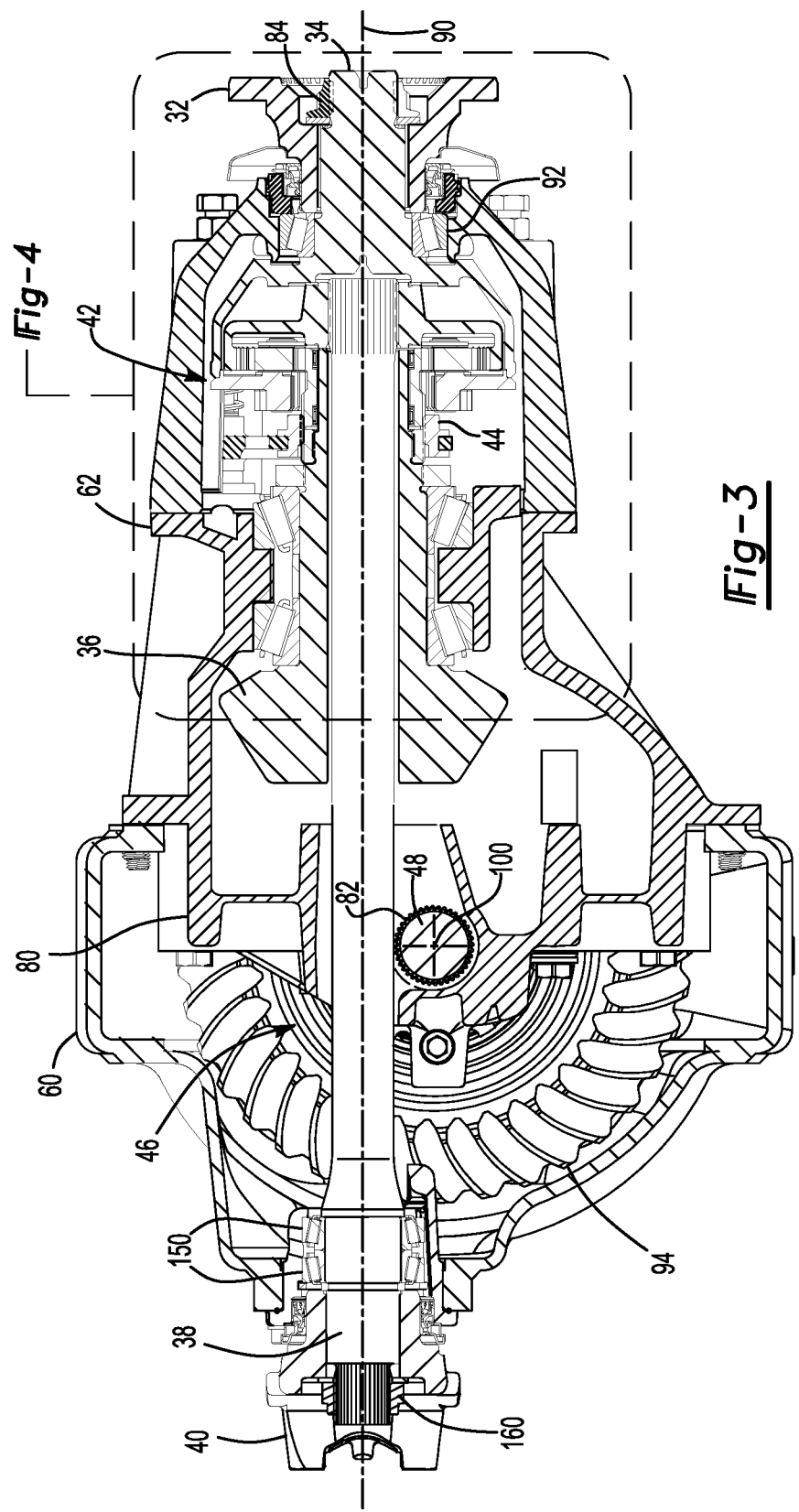
FIG. 3 is a section view of the drive axle assembly of FIG. 2 along section line 3-3.

Referring to FIGS. 2 and 3, the differential carrier 62, which may also be called a carrier housing, may be mounted to the center portion 70 of the axle housing 60. The differential carrier 62 may receive the interaxle differential unit 42 and support components of the differential 46. As is best shown in FIG. 3, the differential carrier 62 may have one or more bearing supports 80.

The bearing support 80 may support or receive a roller bearing assembly 82 that may rotatably support the differential 46. For example, two bearing supports 80 may be received in the center portion 70 and may be located proximate opposite sides of the differential 46.

Figure 6:
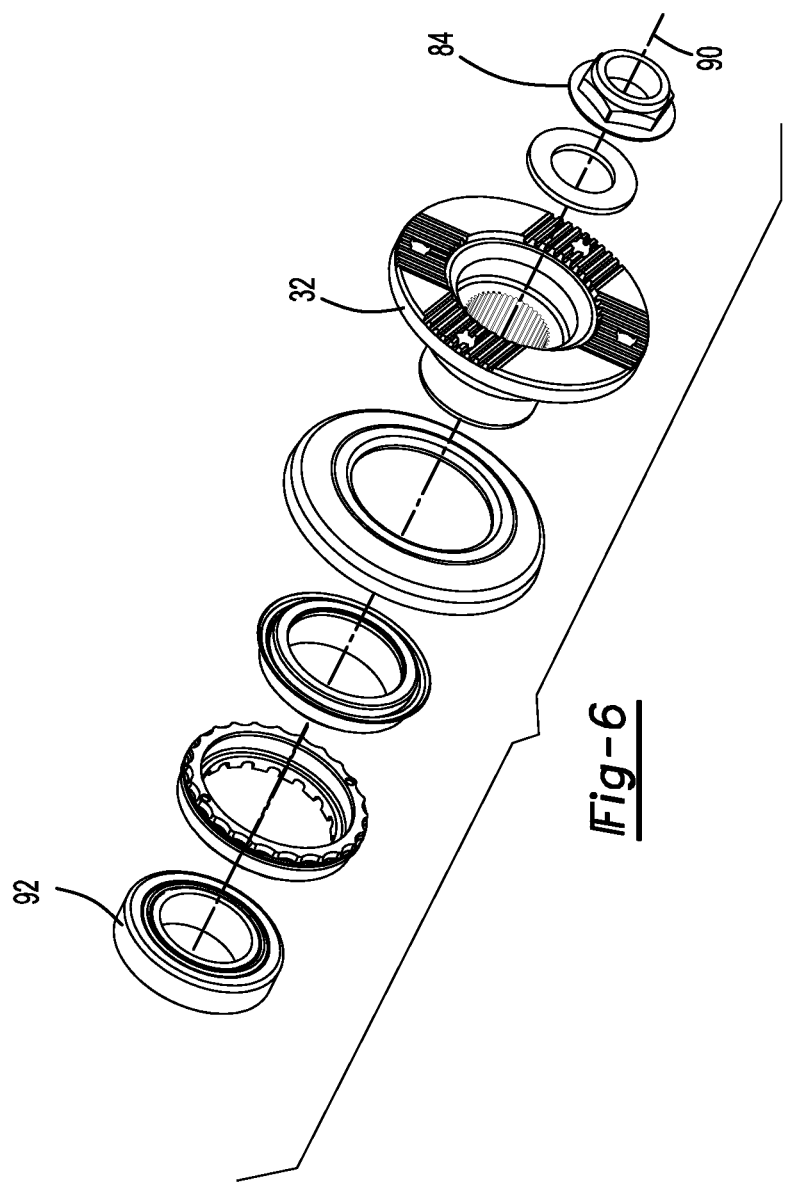
FIGS. 6-8 are exploded views of a portion of the drive axle assembly shown in FIG. 3 without a differential carrier.
Figure 9:
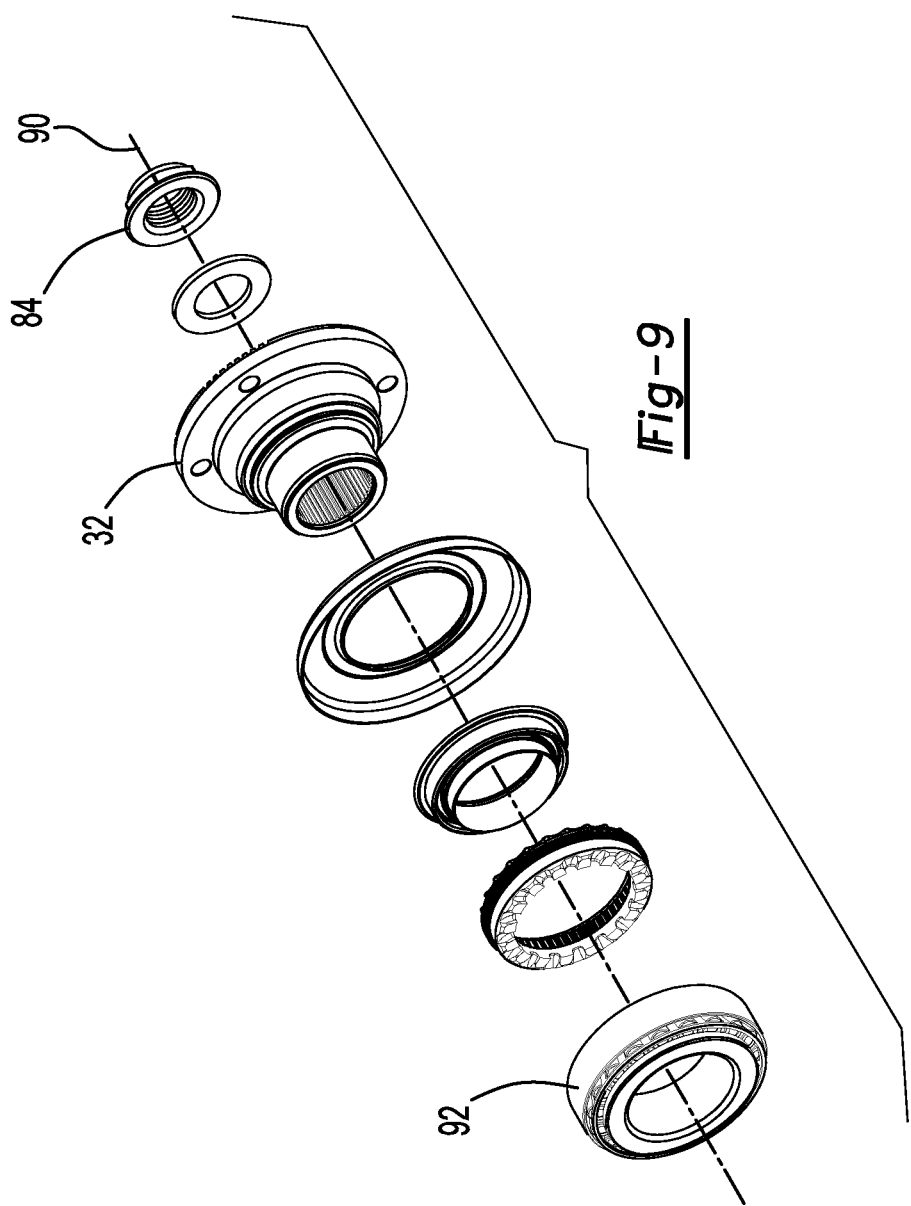
FIGS. 9-11 are exploded views that show the opposite sides of the components shown in FIGS. 6-8.

Referring to FIGS. 3, 6 and 9, the input yoke 32 may facilitate coupling of the first drive axle assembly 14 to the torque source 18. For example, the input yoke 32 may be coupled to the drive shaft that may be coupled to the torque source 18. The input yoke 32 may be mounted on the input shaft 34 as is best shown in FIG. 3. For example, the input yoke 32 may have an opening that receives the input shaft 34 and may be secured to the input shaft 34 with a fastener such as a nut 84.

Figure 7:
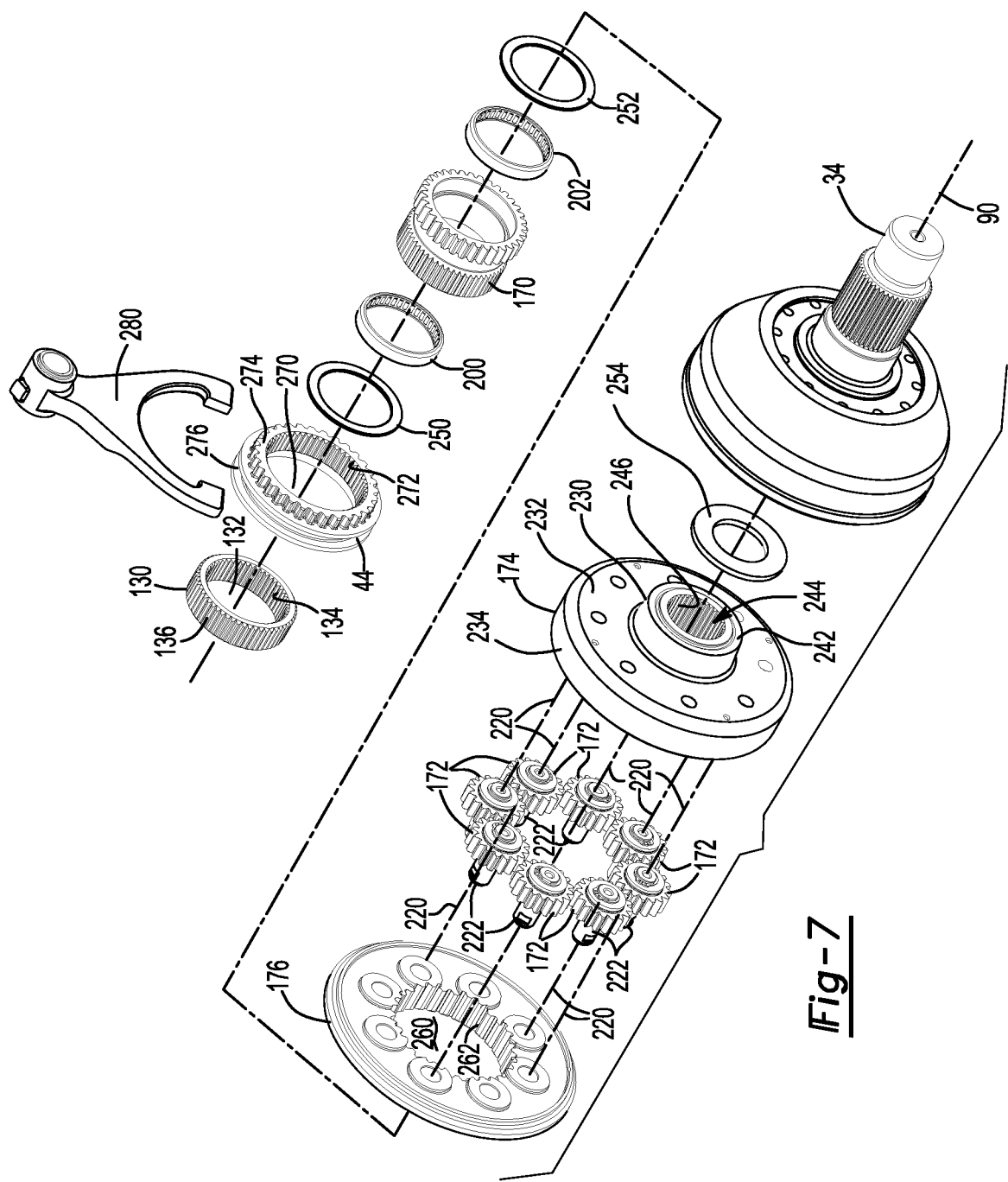
Figure 10:
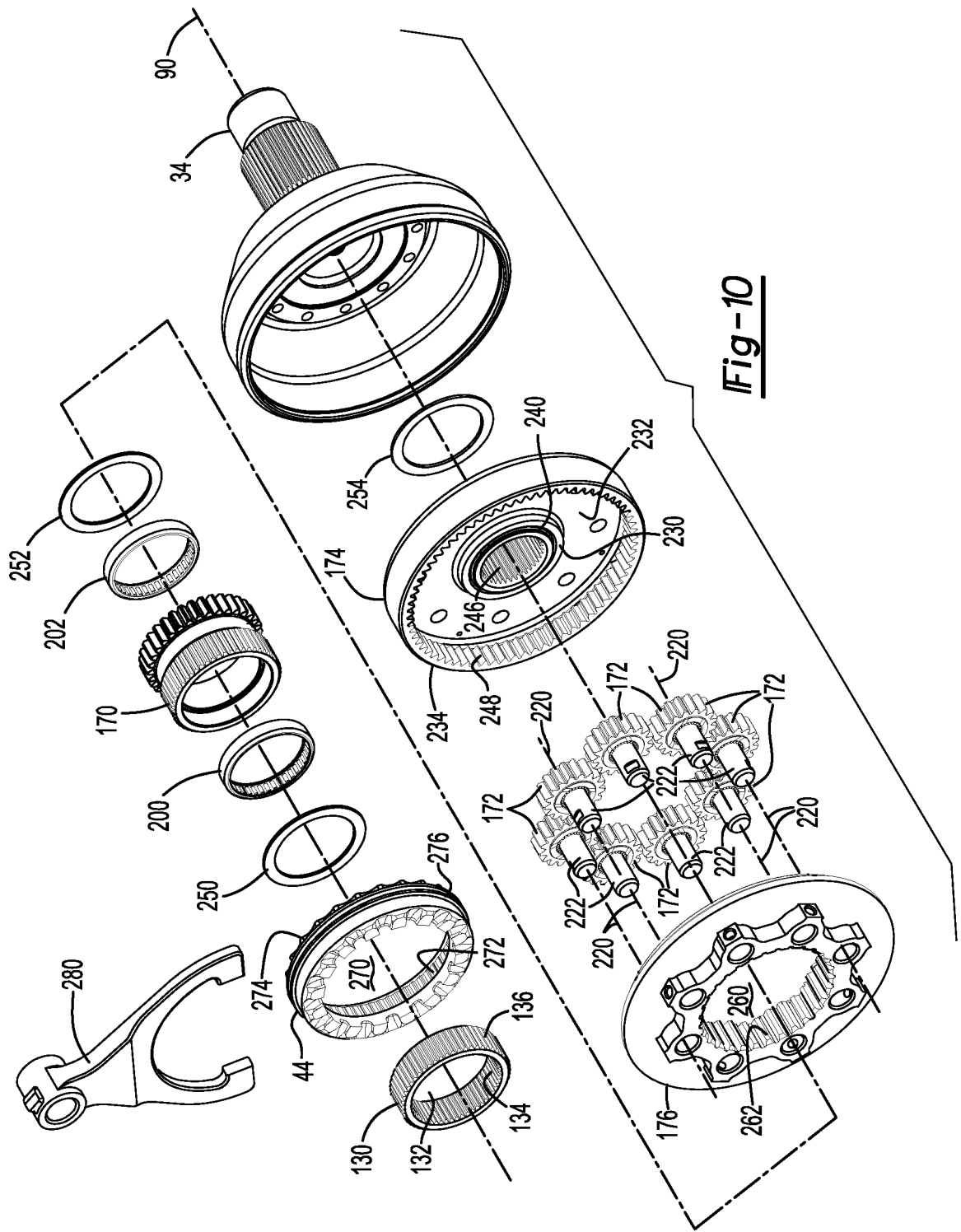

Referring to FIGS. 3, 7 and 10, the input shaft 34 may extend along and may be configured to rotate about a first axis 90. For example, the input shaft 34 may be rotatably supported at least one roller bearing assembly, which may be referred to as an input bearing 92, that may be disposed on the differential carrier 62. The input shaft 34 may be part of the interaxle differential unit 42 or may be operatively connected to the interaxle differential unit 42. For instance, the input shaft 34 may be integrally formed with a case of the interaxle differential unit 42 or may be provided as a separate component that is fixedly coupled to the case in one or more embodiments. As is best shown in FIGS. 3 and 10, the input shaft 34 may be connected to or may have an enlarged cup portion at an end that is disposed opposite the input yoke 32. The cup portion may at least partially define a cavity that may receive components of the interaxle differential unit 42.

Figure 8:
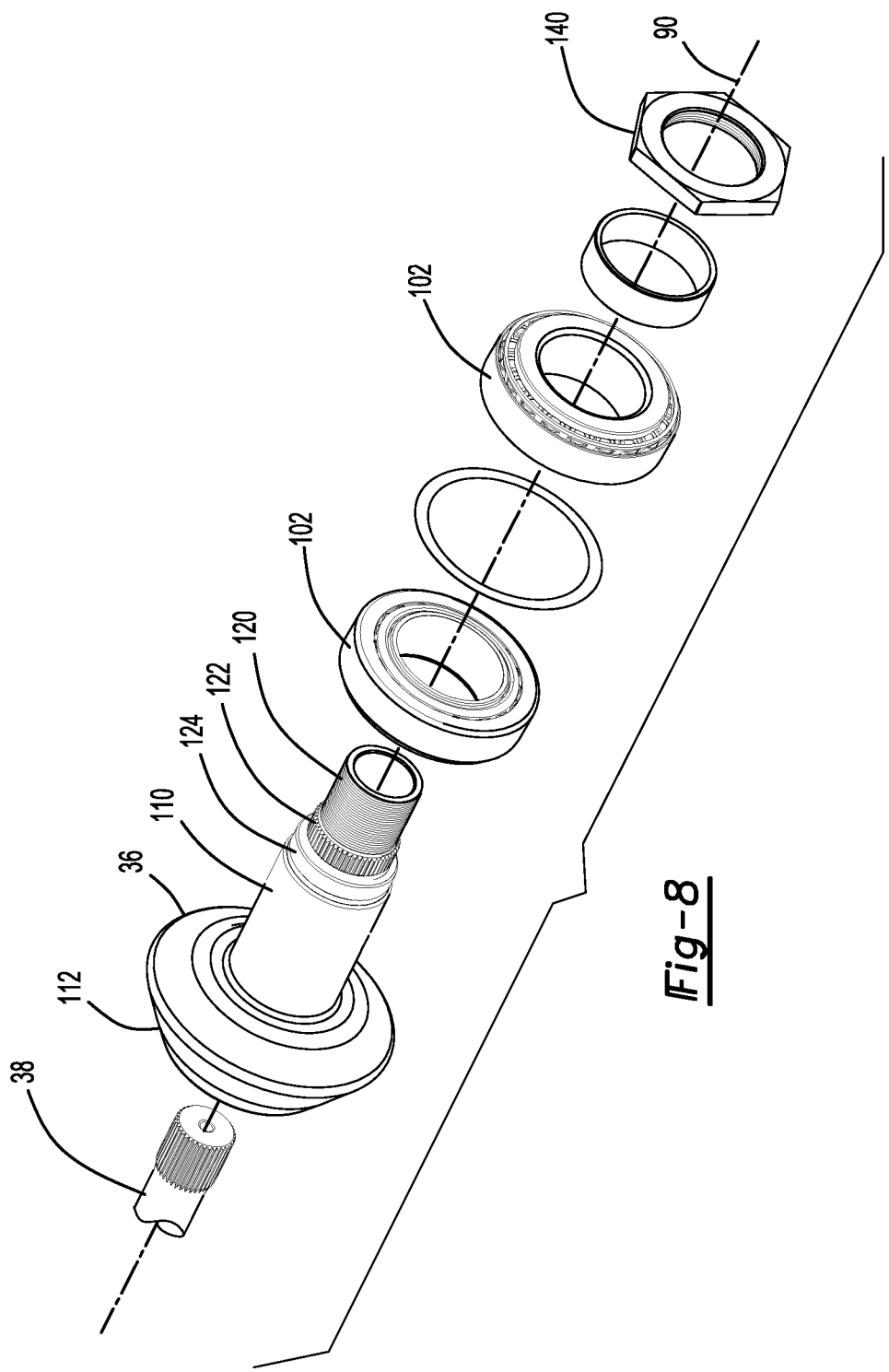
Figure 11:
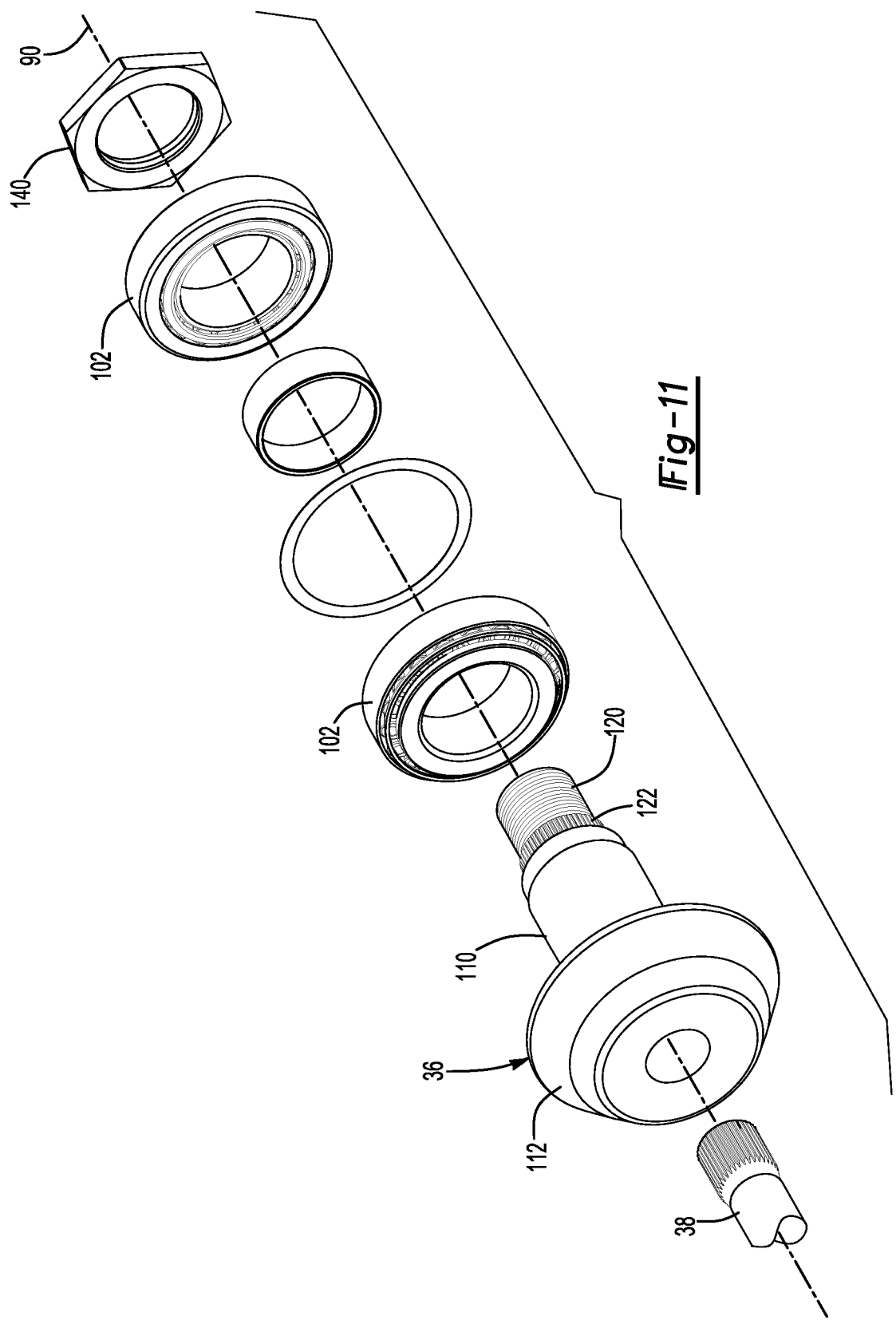

Referring to FIGS. 3, 8 and 11, the drive pinion 36 may provide torque to a ring gear 94 that may be provided with the differential 46. In at least one configuration, the drive pinion 36 may extend along and may be configured to rotate about the first axis 90. The ring gear 94 may be rotatable about a second axis 100. The second axis 100 may be disposed substantially perpendicular to the first axis 90. The drive pinion 36 may be rotatably supported by one or more roller bearing assemblies 102 that may be disposed on the differential carrier 62. In at least one configuration, the drive pinion 36 may include a shaft portion 110 and a gear portion 112.

The shaft portion 110 may extend from the interaxle differential unit 42 to the gear portion 112. The shaft portion 110 may include a passage through which the output shaft 38 may extend. The shaft portion 110 may also include an end portion 120, a drive pinion spline 122, and a threaded portion 124.

Referring primarily to FIG. 8, the end portion 120 may extend from a distal end of the shaft portion 110 that may be disposed opposite the gear portion 112. The end portion 120 may have an exterior circumferential surface that may extend in an axial direction from the distal end of the shaft portion 110 toward or to the drive pinion spline 122. The end portion 120 may support a sun gear of the interaxle differential unit 42 as will be discussed in more detail below and may have a smaller diameter than the drive pinion spline 122.

The drive pinion spline 122 may be axially positioned between the end portion 120 and the threaded portion 124. The drive pinion spline 122 may include a plurality of teeth that may be disposed substantially parallel to the first axis 90 and may mesh or mate with a corresponding spline on a coupling ring 130, which is best shown in FIGS. 3, 7 and 10. For example, the coupling ring 130 may have a coupling ring hole 132 that may receive the shaft portion 110 of the drive pinion 36. In addition, the coupling ring 130 may have inner teeth 134 and outer teeth 136.

The inner teeth 134 may be disposed in the coupling ring hole 132 and may extend toward and may be arranged around the first axis 90. The inner teeth 134 may mesh or mate with the drive pinion spline 122. As such, the coupling ring 130 may rotate with the drive pinion 36.

The outer teeth 136 may be disposed opposite the inner teeth 134. The outer teeth 136 may be disposed opposite the inner teeth 134 and may be arranged around and extend away from the first axis 90. The outer teeth 136 may selectively mesh or mate with a corresponding spline on the shift collar 44 as will be described in more detail below.

The threaded portion 124 may be axially positioned between the drive pinion spline 122 and the gear portion 112. The threaded portion 124 may extend around the first axis 90. The thread or threads of the threaded portion 124 may mate with corresponding threads of an adjuster nut 140, which is best shown in FIGS. 3, 8 and 11, that may exert a preload force on the roller bearing assemblies 102 and may inhibit axial movement of the roller bearing assemblies away from the gear portion 112. The threaded portion 124 may have a larger diameter than the end portion 120 and the drive pinion spline 122.

The gear portion 112 may be disposed at an end of the shaft portion 110. The gear portion 112 may have a plurality of teeth that may mesh or mate with corresponding teeth on the ring gear 94.

Referring to FIG. 3, the output shaft 38 may extend along and may be configured to rotate about the first axis 90. For instance, the output shaft 38 may be supported by one or more roller bearings that may be disposed on the housing assembly 30, such as one or more output bearings 150 that may be disposed near or at an opposite end of the housing assembly 30 from the input bearing 92. The output shaft 38 may extend through the drive pinion 36 and may extend at least partially through the interaxle differential unit 42 as will be discussed in more detail below. The output shaft 38 may be coupled to the interaxle differential unit 42 at a first end. For example, the output shaft 38 may be fixedly coupled to a planetary ring gear of the interaxle differential unit 42. The output shaft 38 may be fixedly coupled to the output yoke 40 at a second end that may be disposed opposite the first end.

Referring to FIGS. 2 and 3, the output yoke 40 may facilitate coupling of the output shaft 38 to the second drive axle assembly 16. For example, the output yoke 40 may be coupled to a connecting shaft, such as the prop shaft 22. The output yoke 40 may be mounted on the output shaft 38. For instance, the output yoke 40 may have an opening that receives the output shaft 38 may be secured to the output shaft 38 with a fastener like a nut 160.

Figure 4:
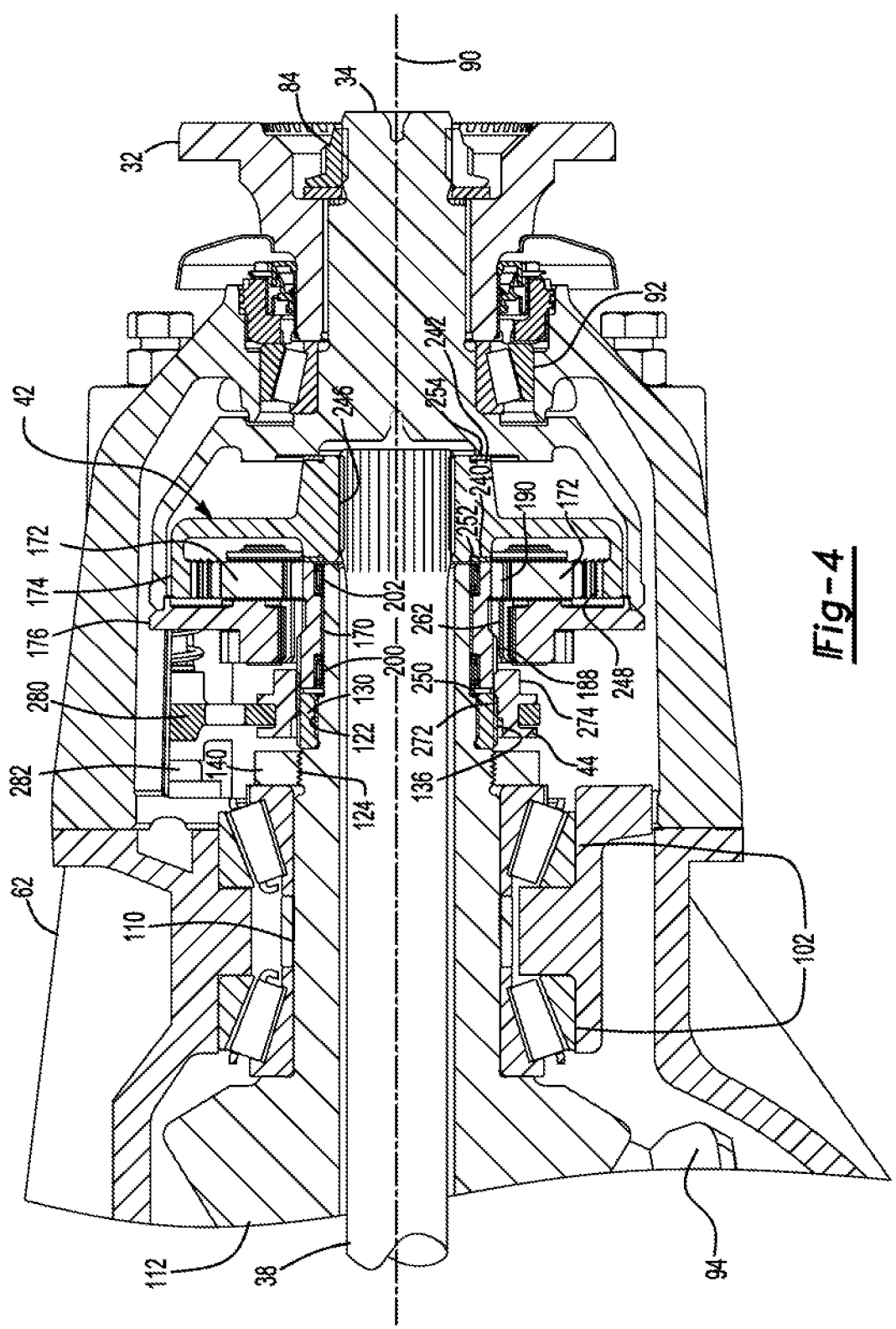
FIG. 4 is a magnified view of a portion of the drive axle assembly shown in FIG. 3 with a shift collar in a first position.

Referring to FIGS. 3 and 4, the interaxle differential unit 42 may operatively connect the input shaft 34 to the drive pinion 36, the output shaft 38, or both. The interaxle differential unit 42 may compensate for speed differences between different drive axle assemblies, such as speed differences between the first drive axle assembly 14 and a second drive axle assembly 16. In at least one configuration, the interaxle differential unit 42 may include a planetary gear set that may include a sun gear 170, at least one planet gear 172, a planetary ring gear 174, and a planet gear carrier 176.

Figure 12:
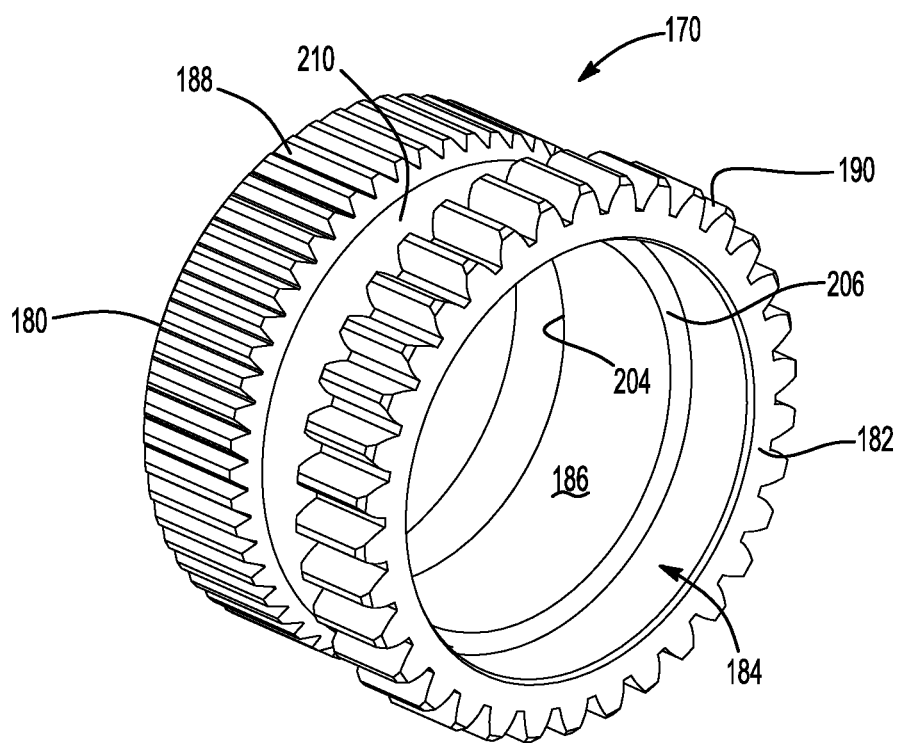
FIG. 12 is a perspective view of a sun gear that may be provided with an interaxle differential unit.

Referring to FIGS. 4 and 12, the sun gear 170 may be disposed proximate the center of the planetary gear set and may be rotatable about the first axis 90. In addition, the sun gear 170 may extend through the planet gear carrier 176 and partially through the planetary ring gear 174. As is best shown primarily with reference to FIG. 12, the sun gear 170 may be configured as a hollow tubular body that may include a first end surface 180, a second end surface 182, a sun gear hole 184, a spacer portion 186, a first set of sun gear teeth 188, and a second set of sun gear teeth 190.

The first end surface 180 may be disposed at an end of the sun gear 170 that may face toward the drive pinion 36. The first end surface 180 may be disposed outside the planetary ring gear 174 and the planet gear carrier 176.

The second end surface 182 may be disposed at an end of the sun gear 170 that may face toward the input shaft 34 and the planetary ring gear 174. As such, the second end surface 182 may be disposed opposite the first end surface 180. The second end surface 182 may be disposed inside the planetary ring gear 174.

The sun gear hole 184 may extend from the first end surface 180 to the second end surface 182. The sun gear hole 184 may extend along and may be centered about the first axis 90. The drive pinion 36 may extend into or through the sun gear hole 184 and may be spaced apart from the sun gear 170. In addition, the output shaft 38 may extend through the sun gear hole 184.

As is best shown with reference to FIGS. 4, 7 and 10, the sun gear hole 184 may receive a first sun gear bearing 200 and a second sun gear bearing 202. The first and second sun gear bearings 200, 202 may be configured as roller bearing assemblies that may extend around and may be disposed on the end portion 120 of the drive pinion 36, which is best shown in FIG. 8. The first and second sun gear bearings 200, 202 may extend from the drive pinion 36 to the sun gear 170 and may rotatably support the sun gear 170 on the drive pinion 36.

Referring to FIG. 12, the spacer portion 186 may be disposed in the sun gear hole 184. The spacer portion 186 may be axially positioned between the first end surface 180 and the second end surface 182 and may protrude radially toward the first axis 90. The spacer portion 186 may have a smaller inside diameter than adjacent portions of the sun gear hole 184 and may separate and help position the first and second sun gear bearings 200, 202 in the sun gear hole 184. The spacer portion 186 may define a first step surface 204 and a second step surface 206.

The first step surface 204 may face toward the first end surface 180 and may be spaced apart from the first end surface 180. In at least one configuration, the first step surface 204 may be disposed substantially perpendicular to the first axis 90. The first step surface 204 may engage the first sun gear bearing 200 and may inhibit axial movement of the first sun gear bearing 200 toward the second end surface 182, or to the right from the perspective shown in FIG. 4.

The second step surface 206 may be disposed opposite the first step surface 204. The second step surface 206 may face toward the second end surface 182 and may be spaced apart from the second end surface 182. In at least one configuration, the second step surface 206 may be disposed substantially perpendicular to the first axis 90. The second step surface 206 may engage the second sun gear bearing 202 and may inhibit axial movement of the second sun gear bearing 202 toward the first end surface 180, or to the left from the perspective shown in FIG. 4.

The first set of sun gear teeth 188 may be disposed opposite the sun gear hole 184 and may be arranged around the sun gear hole 184 in a repeating arrangement. For example, the sun gear teeth 188 may extend radially away from the first axis 90 and may extend axially in a direction that is substantially parallel to the first axis 90. The first set of sun gear teeth 188 may be disposed closer to the first end surface 180 than the second set of sun gear teeth 190. As one example, the first set of sun gear teeth 188 may extend axially from the first end surface 180 toward the second set of sun gear teeth 190. As is best shown in FIG. 4, the first set of sun gear teeth 188 may be disposed opposite the first sun gear bearing 200.

The second set of sun gear teeth 190 may be disposed opposite the sun gear hole 184 and may be arranged around the sun gear hole 184 in a repeating arrangement. For example, the sun gear teeth 190 may extend radially away from the first axis 90 and may extend axially in a direction that is substantially parallel to the first axis 90. The second set of sun gear teeth 190 may be disposed closer to the second end surface 182 than the first set of sun gear teeth 188. As an example, the second set of sun gear teeth 190 may extend axially from the second end surface 182 toward the first set of sun gear teeth 188. In at least one configuration, the second set of sun gear teeth 190 may have a larger outside diameter than the first set of sun gear teeth 188. As is best shown in FIG. 4, the second set of sun gear teeth 190 may be disposed opposite the second sun gear bearing 202.

The second set of sun gear teeth 190 may be spaced apart from the first set of sun gear teeth 188. For instance, a connecting region 210, which is best shown in FIG. 12, may be disposed between the first set of sun gear teeth 188 and the second set of sun gear teeth 190 that may have a smaller diameter than the first set of sun gear teeth 188 and the second set of sun gear teeth 190.

Referring to FIGS. 4, 7 and 10, at least one planet gear 172 may be rotatably disposed between the sun gear 170 and the planetary ring gear 174. In the configuration shown, eight planet gears 172 are depicted; however, it is contemplated that a greater or lesser number of planet gears 172 may be provided. The planet gears 172 may be spaced apart from each other and each planet gear 172 may be rotatable about a different planet gear axis 220. The planet gear axes 220 may be disposed substantially parallel to the first axis 90. Each planet gear 172 may have a hole and a set of teeth. The hole may be a through hole that may extend through the planet gear 172. The hole may receive a pin 222 about which the planet gear 172 may rotate. The pin 222 may be fixedly mounted to the planet gear carrier 176. Optionally, a bearing may also be received in the hole and may rotatably support the planet gear 172 on a corresponding pin 222. The set of teeth may be disposed opposite the hole. The set of teeth may mesh with the second set of sun gear teeth 190 and teeth on the planetary ring gear 174.

The planetary ring gear 174 may extend around the first axis 90 and may receive the planet gears 172. In addition, the planetary ring gear 174 may be rotatable with respect to the drive pinion 36. In at least one configuration, the planetary ring gear 174 may include a mounting hub 230, a first flange 232, and a second flange 234.

The mounting hub 230 may facilitate mounting of the planetary ring gear 174 to the output shaft 38. The mounting hub 230 may be axially positioned between the drive pinion 36 and the input shaft 34 and may define a hole that may receive the output shaft 38. In at least one configuration, the mounting hub 230 may have a first end 240, a second end 242, a mounting hub hole 244, and a mounting hub spline 246. These features are best shown with reference to FIGS. 4, 7 and 10.

The first end 240 may face toward the sun gear 170. The first end 240 may be disposed substantially perpendicular to the first axis 90 in one or more embodiments.

The second end 242 may be disposed opposite the first end 240 and may face toward the input shaft 34. The second end 242 may be disposed substantially perpendicular to the first axis 90 in one or more embodiments.

First, second, and third thrust bearings 250, 252, 254 may be provided to help axially position and inhibit axial movement of the sun gear 170 and the planetary ring gear 174. For example, the first thrust bearing 250 may extend from an end of the coupling ring 130 to the first end surface 180 of the sun gear 170. The second thrust bearing 252 may extend from second end surface 182 of the sun gear 170 to the first end 240 of the mounting hub 230. The third thrust bearing 254 may extend from the second end 242 of the mounting hub 230 to a side or surface of the input shaft 34 that faces toward the output shaft 38. The first thrust bearing 250 may be received in the shift collar hole 270. The second and third thrust bearings 252, 254 may be disposed outside of the mounting hub hole 244.

The mounting hub hole 244 may extend from the first end 240 to the second end 242. The mounting hub hole 244 may extend along and may be centered about the first axis 90.

The mounting hub spline 246 may be disposed in the mounting hub hole 244 and may facilitate mounting of the planetary ring gear 174 to the output shaft 38. For example, the mounting hub spline 246 may mesh or mate with a corresponding spline or set of splines on the output shaft 38 such that the planetary ring gear 174 and the output shaft 38 rotate together about the first axis 90.

Referring to FIGS. 7 and 10, the first flange 232 may extend radially outward from the mounting hub 230 to the second flange 234.

The second flange 234 may extend from an end of the first flange 232. For instance, the second flange 234 may extend toward and may be spaced apart from the planet gear carrier 176. A plurality of teeth 248 may be provided on the second flange 234 that may extend toward the first axis 90 and may mesh with teeth on the planet gears 172.

Referring to FIGS. 4, 7 and 10, the planet gear carrier 176 may be rotatable about the first axis 90. For example, the planet gear carrier 176 may be fixedly coupled to the cup portion of the input shaft 34. As such, the input shaft 34 and the planet gear carrier 176 may rotate together about the first axis 90. The planet gear carrier 176 may support the pins 222. For example, the pins 222 may extend from a side of the planet gear carrier 176 that faces toward the first flange 232 of the planetary ring gear 174. In at least one configuration, the planet gear carrier 176 may include a planet carrier hole 260 and a set of planet carrier teeth 262.

The planet carrier hole 260 may extend around the first axis 90 and may receive the sun gear 170 such that the planet gear carrier 176 is spaced apart from the sun gear 170.

The set of planet carrier teeth 262 may be disposed in the planet carrier hole 260 and may extend toward the first axis 90. The planet carrier teeth 262 may be arranged in a repeating arrangement around the first axis 90 and may extend axially in a direction that is substantially parallel to the first axis 90. The shift collar 44 may selectively mesh or mate with the set of planet carrier teeth 262 as will be discussed in more detail below. The set of planet carrier teeth 262 may be disposed closer to the first axis 90 than the planet gear axes 220.

Referring to FIGS. 4, 7 and 10, The shift collar 44 may be movable in an axial direction or in a direction that extends along the first axis 90 between a first position and a second position as will be discussed in more detail below. The shift collar 44 may be generally ring-shaped and may include a shift collar hole 270, a set of internal teeth 272, a set of external teeth 274, and a shift collar groove 276.

The shift collar hole 270 may be a through hole that may extend through the shift collar 44 and extend around the first axis 90. The shift collar hole 270 may receive the coupling ring 130 and may selectively receive the sun gear 170.

The set of internal teeth 272 may be disposed in the shift collar hole 270. The internal teeth 272 may extend toward the first axis 90 and may mesh or mate with the outer teeth 136 of the coupling ring 130. As such, the mating teeth may allow the shift collar 44 to move in an axial direction or along the first axis 90 while inhibiting rotation of the shift collar 44 about the first axis 90 with respect to the coupling ring 130.

The set of external teeth 274 may be disposed opposite the shift collar hole 270 and the set of internal teeth 272. The external teeth 274 may extend away from the first axis 90 and may selectively mesh or mate with the set of planet carrier teeth 262.

The shift collar groove 276 may face away from the first axis 90 and may extend around the first axis 90. The shift collar groove 276 may receive a linkage, such as a shift fork 280, that may operatively connect the shift collar 44 to an actuator 282.

Referring to FIG. 4, the actuator 282 may move the shift collar 44 between a first position and a second position. The actuator 282 may be of any suitable type, such as a pneumatic, hydraulic, electrical, mechanical, or electromechanical actuator.

The shift collar 44 is shown in the first position in FIG. 4. The set of internal teeth 272 of the shift collar 44 may mesh or mate with the outer teeth 136 of the coupling ring 130 and with the first set of sun gear teeth 188, and the set of external teeth 274 may be spaced apart from and may not mesh or mate with the planet carrier teeth 262 when the shift collar 44 is in the first position. As such, the sun gear 170 and the drive pinion 36 may rotate together about the first axis 90. Torque may be transmitted to the first drive axle assembly 14 and the second drive axle assembly 16 when the shift collar 44 is in the first position. For example, torque may be transmitted from the interaxle differential unit 42 to the drive pinion 36 via the sun gear 170, shift collar 44, and coupling ring 130 while torque may be transmitted from the interaxle differential unit 42 to the output shaft 38 via the planetary ring gear 174 and planet gears 172. Moreover, the planetary gear set of the interaxle differential unit 42 may allow the drive pinion 36 and the output shaft 38 to rotate at different speeds about the first axis 90.

Figure 5:
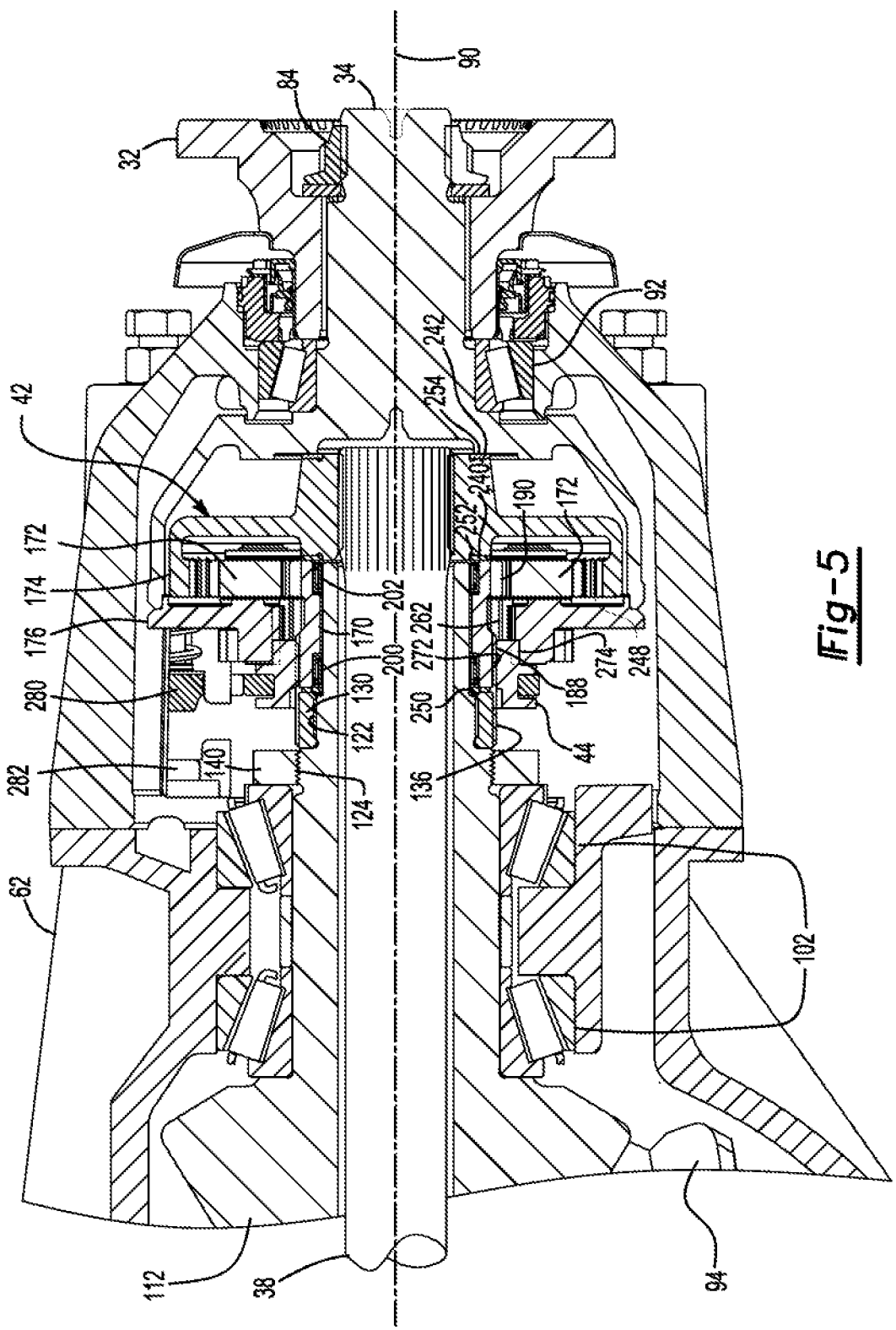
FIG. 5 is a magnified view of the portion of the drive axle assembly with the shift collar in a second position.

The shift collar 44 is shown in the second position in FIG. 5. The set of internal teeth 272 of the shift collar 44 may mesh or mate with the first set of sun gear teeth 188 but may not mesh or mate with the outer teeth 136 of the coupling ring 130, and the set of external teeth 274 may mesh or mate with the planet carrier teeth 262 when the shift collar 44 is in the second position. As such, the sun gear 170 may rotate with the planet gear carrier 176 about the first axis 90 and may be free to rotate about the first axis 90 independently of the drive pinion 36. Accordingly, torque may not be transmitted between the sun gear 170 and the drive pinion 36. As an example, input torque that is provided to the input shaft 34 may cause the sun gear 170 to rotate about the first axis 90 with respect to the drive pinion 36 and torque may not be transmitted from the drive pinion 36 to the differential 46 and its associated axle shafts 48 and wheel assemblies 20. Torque may be transmitted between the input shaft 34 and the output shaft 38 via the interaxle differential unit 42 when the shift collar 44 is in the second position. As an example, input torque that is provided to the input shaft 34 may be transmitted to the output shaft 38 via the planet gear carrier 176, planet gears 172, and the planetary ring gear 174.

Referring to FIGS. 1 and 2, the differential 46 of the first drive axle assembly 14, which may be referred to as a first differential, may be disposed in the center portion 70 of the housing assembly 30. The differential associated with the first drive axle assembly 14 may be referred to as a first differential 46. The differential 46 may transmit torque to the wheel assemblies 20 and permit the wheel assemblies 20 of the first drive axle assembly 14 to rotate at different velocities. An abbreviated discussion of the operation of the differential 46 follows.

Torque that is provided to the drive pinion 36 may be transmitted to the ring gear 94 of the differential 46. The differential 46 may be operatively connected to the axle shafts 48 and may permit the axle shaft 48 to rotate at different rotational speeds in a manner known by those skilled in the art. As such, the differential 46 may receive torque via the ring gear 94 and provide torque to the axle shafts 48 and to the associated wheel assemblies 20 provided that any associated wheel end disconnects 50 are connected.

The second drive axle assembly 16 may also have a differential 46, which may be referred to as a second differential, that may be disposed in the center portion 70 of its housing assembly. The differential 46 may transmit torque to the wheel assemblies 20 and permit the wheel assemblies 20 of the second drive axle assembly 16 to rotate at different velocities.

Referring to FIGS. 1 and 2, the axle shafts 48 may be configured to transmit torque from an associated differential 46 to corresponding wheel assemblies 20. For example, two axle shafts 48 may be provided such that each axle shaft 48 extends through a different arm portion 72 of axle housing 60. The axle shafts 48 may extend along and may be rotatable about the second axis 100 by the differential 46. Optionally, each axle shaft 48 may be operatively connected to a wheel end disconnect 50.

Referring to FIG. 1, a pair of wheel end disconnects 50 may be provided with a drive axle assembly. For example, a wheel end disconnect 50 may be associated with each axle shaft 48. The wheel end disconnect 50 may selectively connect the differential 46 to a corresponding wheel hub 290 that may be rotatable about the second axis 100 and that may support and facilitate mounting of a wheel assembly 20. The wheel end disconnect 50 may be provided in various locations. For instance, the wheel end disconnect 50 may be provided with the differential 46 or located adjacent to the differential 46 and an end of a corresponding axle shaft 48. As another option, the wheel end disconnect 50 may be disposed at an intermediate location that may be disposed between the differential 46 and the wheel hub 290 and may be spaced apart from the differential 46 and the wheel hub 290, such as is disclosed in U.S. Pat. No. 8,651,994, the disclosure of which is hereby incorporated by reference in its entirety. As another option, the wheel end disconnect 50 may be disposed adjacent to the wheel hub 290 or inside the wheel hub 290, as is disclosed in U.S. patent application Ser. Nos. 15/667,677 and 15/964,780, the disclosures of which are hereby incorporated by reference in their entirety.

Referring to FIG. 1, a control system 300 may monitor and/or control operation of the axle system. The control system 300 may include one or more electronic controllers that may monitor and/or control various components of the drive axle system 12. For example, the control system 300 may be configured to control actuation of the shift collar 44 to operatively connect the drive pinion 36 to the torque source 18 such that torque may be transmitted from the torque source 18 to the first differential 46 and to operatively disconnect the drive pinion 36 from the torque source 18 such that torque may not be transmitted from the torque source 18 to the first differential 46. The control system 300 may also control actuation or operation of the wheel end disconnects 50 to connect or disconnect a differential 46 from a corresponding wheel hub 290 to permit or prevent the transmission of torque between a differential 46 and the wheel hub 290.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive axle system having a drive axle assembly comprising:
    an input shaft that is rotatable about an axis;
    a drive pinion that is spaced apart from the input shaft;
    an output shaft that extends through the drive pinion;
    an interaxle differential unit configured to operatively connect the input shaft to the drive pinion and the output shaft, wherein the interaxle differential unit includes:
        a planet carrier that is rotatable about the axis with the input shaft;
        a planetary ring gear that is rotatable about the axis with the output shaft;
        a sun gear that is rotatably disposed on the drive pinion; and
        a planet gear that is rotatably disposed on the planet carrier and meshes with the planetary ring gear and the sun gear; and
    a shift collar that is moveable along the axis between a first position in which the shift collar operatively connects the sun gear to the drive pinion and a second position in which the shift collar operatively connects the sun gear to the planet carrier.

2. The drive axle system of claim 1 wherein torque is transmitted between the sun gear and the drive pinion by the shift collar when the shift collar is in the first position.

3. The drive axle system of claim 1 wherein torque is not transmitted between the interaxle differential unit and the drive pinion when the shift collar is in the second position.

4. The drive axle system of claim 1 wherein the drive pinion is rotatable with respect to the planetary ring gear.

5. The drive axle system of claim 1 wherein the drive pinion is spaced apart from the interaxle differential unit.

6. The drive axle system of claim 1 wherein the drive pinion and the output shaft are rotatable about the axis.

7. The drive axle system of claim 1 wherein the sun gear has a first set of sun gear teeth that mesh with the shift collar and a second set of sun gear teeth that mesh with the planet gear when the shift collar is in the first position and the second position.

8. The drive axle system of claim 7 wherein the first set of sun gear teeth is spaced apart from the second set of sun gear teeth.

9. The drive axle system of claim 7 wherein the first set of sun gear teeth is partially received in the planet carrier but not in the planetary ring gear and the second set of sun gear teeth is received in the planetary ring gear.

10. The drive axle system of claim 7 wherein the sun gear has a sun gear hole that receives the drive pinion and first and second sun gear bearings that are received in the sun gear hole and receive the drive pinion to rotatably support the sun gear on the drive pinion, wherein the first sun gear bearing is disposed opposite the first set of sun gear teeth and the second sun gear bearing is disposed opposite the second set of sun gear teeth.

11. The drive axle system of claim 10 wherein the sun gear includes a spacer portion that is disposed in the sun gear hole and extends toward the axis, wherein the spacer portion is axially positioned between the first and second sun gear bearings and has a first step surface that engages the first sun gear bearing and a second step surface that engages the second sun gear bearing.

12. The drive axle system of claim 7 further comprising a coupling ring that is receives the drive pinion and is rotatable about the axis with the drive pinion, wherein the coupling ring is disposed adjacent to the sun gear and has outer teeth that face away from the axis.

13. The drive axle system of claim 12 wherein the drive pinion has a threaded portion and a drive pinion spline that is axially positioned between the threaded portion and the sun gear, and the coupling ring has inner teeth that are disposed opposite the outer teeth, wherein the inner teeth mesh with the drive pinion spline to inhibit rotation of the coupling ring with respect to the drive pinion.

14. The drive axle system of claim 12 wherein the shift collar has a shift collar hole and a set of internal teeth that extend into the shift collar hole, wherein the set of internal teeth mesh with the outer teeth and the first set of sun gear teeth when the shift collar is in the first position.

15. The drive axle system of claim 14 wherein the set of internal teeth mesh with the first set of sun gear teeth and are spaced apart from the outer teeth when the shift collar is in the second position.

16. A drive axle system comprising:
    a first drive axle assembly that includes:
        a first differential that is coupled to an axle shaft;
        a drive pinion that is rotatable about an axis and engages the first differential;
        an input shaft that is rotatable about the axis;
        an output shaft that is spaced apart from the input shaft and the drive pinion;

an interaxle differential unit that is spaced apart from the drive pinion, wherein the interaxle differential unit includes:
  a planet carrier that is rotatable about the axis with the input shaft;
  a planetary ring gear that is coupled to the output shaft such that the output shaft is rotatable about the axis with the planetary ring gear;
  a sun gear that is rotatably disposed on the drive pinion; and
  a planet gear that is rotatably disposed on the planet carrier and meshes with the planetary ring gear and the sun gear; and
a shift collar that is moveable along the axis between a first position in which torque is transmitted between the interaxle differential unit and the first differential and between the interaxle differential unit and the output shaft, and a second position in which the shift collar operatively connects the sun gear to the planet carrier and in which torque is not transmitted between the interaxle differential unit and the first differential.

17. The drive axle system of claim 16 further comprising a second drive axle assembly that is connected in series with the first drive axle assembly via the output shaft, wherein torque is transmitted between the interaxle differential unit and the second drive axle assembly via the output shaft but is not transmitted between the interaxle differential unit and the first differential when the shift collar is in the second position.

18. The drive axle system of claim 16 wherein the output shaft extends through the drive pinion.

19. A drive axle system comprising:
a first drive axle assembly that includes:
  a first differential that is coupled to an axle shaft;
  a drive pinion that is rotatable about an axis and engages the first differential;
  an input shaft that is rotatable about the axis;
  an output shaft that is spaced apart from the input shaft and the drive pinion;
  an interaxle differential unit that is spaced apart from the drive pinion, wherein the interaxle differential unit includes:
    a planet carrier that is rotatable about the axis with the input shaft;
    a planetary ring gear that is coupled to the output shaft such that the output shaft is rotatable about the axis with the planetary ring gear;
    a sun gear that is rotatably disposed on the drive pinion; and
    a planet gear that is rotatably disposed on the planet carrier and meshes with the planetary ring gear and the sun gear; and
  a shift collar that is moveable along the axis between a first position in which torque is transmitted between the interaxle differential unit and the first differential and between the interaxle differential unit the output shaft and a second position in which torque is not transmitted between the interaxle differential unit and the first differential,
  wherein the planet gear is rotatable about a planet gear axis, the planet carrier has a planet carrier hole that receives the sun gear and a set of planet carrier teeth that are disposed in the planet carrier hole and extend toward the axis, wherein the shift collar is spaced apart from the planet carrier teeth when the shift collar is disposed in the first position and the set of planet carrier teeth is disposed closer to the axis than the planet gear axis.

20. The drive axle system of claim 19 wherein the shift collar has a set of internal teeth and a set of external teeth that is disposed opposite the set of internal teeth, and the sun gear has a first set of sun gear teeth that extend away from the axis, wherein the set of internal teeth mesh with the first set of sun gear teeth and the set of external teeth mesh with the planet carrier teeth when the shift collar is in the second position.

* * * * *

UNITED STATES PATENT AND TRADEMARK OFFICE
CERTIFICATE OF CORRECTION

PATENT NO.           : 10,591,037 B2
APPLICATION NO.      : 16/059226
DATED                : March 17, 2020
INVENTOR(S)          : Dale Eschenburg et al.

Page 1 of 1

It is certified that error appears in the above-identified patent and that said Letters Patent is hereby corrected as shown below:

Column 12, Line 40, Claim 12:
After "further comprising a coupling ring that"
Delete "is".

Signed and Sealed this
Eighteenth Day of August, 2020

Andrei Iancu
*Director of the United States Patent and Trademark Office*